US008909888B2

(12) United States Patent
Goss et al.

(10) Patent No.: US 8,909,888 B2
(45) Date of Patent: Dec. 9, 2014

(54) SECURE ERASURE OF DATA FROM A NON-VOLATILE MEMORY

(75) Inventors: Ryan James Goss, Prior Lake, MN (US); David Scott Seekins, Shakopee, MN (US); Jonathan W. Haines, Boulder, CO (US); Timothy R. Feldman, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 326 days.

(21) Appl. No.: 13/098,093

(22) Filed: Apr. 29, 2011

(65) Prior Publication Data

US 2012/0278564 A1 Nov. 1, 2012

(51) Int. Cl.
*G06F 17/24* (2006.01)
*G06F 21/00* (2013.01)
*G06F 12/00* (2006.01)
*G06F 12/02* (2006.01)

(52) U.S. Cl.
CPC ............ *G06F 12/00* (2013.01); *G06F 12/0253* (2013.01)
USPC ........................................................ 711/166

(58) Field of Classification Search
None
See application file for complete search history.

(56) References Cited

U.S. PATENT DOCUMENTS

| 5,931,904 | A | * | 8/1999 | Banga et al. ................... 709/217 |
| 6,154,811 | A | * | 11/2000 | Srbljic et al. ................... 711/118 |
| 7,089,350 | B2 | | 8/2006 | Koren et al. |
| 7,475,203 | B1 | | 1/2009 | Petrillo, Jr. et al. |
| 7,526,620 | B1 | * | 4/2009 | McGovern ..................... 711/159 |
| 7,739,315 | B2 | | 6/2010 | Haga |
| 2006/0080554 | A1 | * | 4/2006 | McDonald et al. ........... 713/189 |
| 2008/0140910 | A1 | * | 6/2008 | Flynn et al. .................... 711/100 |
| 2009/0172250 | A1 | * | 7/2009 | Allen et al. ..................... 711/103 |
| 2009/0319720 | A1 | * | 12/2009 | Stefanus et al. ............... 711/103 |

* cited by examiner

*Primary Examiner* — Aimee Li
*Assistant Examiner* — Candice Rankin
(74) *Attorney, Agent, or Firm* — Hall Estill Attorneys at Law

(57) ABSTRACT

Method and apparatus for securely erasing data from a non-volatile memory, such as but not limited to a flash memory array. In accordance with various embodiments, an extended data set to be sanitized from the memory is identified. The extended data set includes multiple copies of data having a common logical address and different physical addresses within the memory. The extended data set is sanitized in relation to a characterization of the data set. The data sanitizing operation results in the extended data set being purged from the memory and other previously stored data in the memory being retained.

23 Claims, 10 Drawing Sheets

SECURE ERASURE OF DATA FROM A NON-VOLATILE MEMORY

SUMMARY

Various embodiments of the present invention are generally directed to the secure erasure of data from a non-volatile memory, such as but not limited to a flash memory array.

In accordance with various embodiments, an extended data set to be sanitized from the memory is identified. The extended data set includes multiple copies of data having a common logical address stored in different physical addresses within the memory. The extended data set is sanitized in relation to a characterization of the data set. The data sanitizing operation results in the extended data set being purged from the memory and other previously stored data in the memory being retained.

These and other features and advantages which characterize the various embodiments of the present invention can be understood in view of the following detailed discussion and the accompanying drawings.

DETAILED DESCRIPTION

Figure 1:
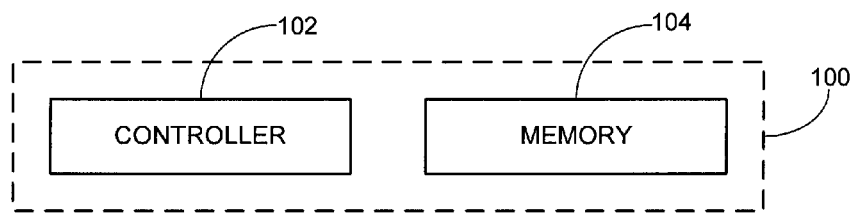
FIG. 1 provides a functional block representation of an exemplary data storage device in accordance with some embodiments.

The present disclosure generally relates to data security, and more particularly to a method and apparatus for securely erasing copies of a data set from a memory.

Memory devices, such as hard disc drives (HDDs), solid-state drives (SSDs), flash memory "thumb" drives, etc., are used in a wide number of consumer, commercial, governmental and military applications. Data security can be an important consideration in operating such devices.

It may be desirable from time to time to subject a memory to a special data sanitizing operation to remove data from the memory. "Sanitizing," or "securely erasing," a memory generally refers to an operation whereby all traces of a data set, including identical copies, prior revisions and in some cases associated metadata, are purged or otherwise altered so that the data cannot be easily recovered by an unauthorized third party. A number of U.S. Federal and State Regulations require memory devices to be securely erased under certain circumstances. Failure to do so may result in civil and/or criminal penalty. Some well-known governmental standards that set forth various requirements for secure erasure include the NIST 800-88 Enhanced Secure Erase Standard and the DoD 5220 Block Erasure Standard.

A non-destructive erasure of data can take place by overwriting the physical locations where existing data are stored a number of consecutive times in order to mask the magnetic, electrical and/or optical signatures of previous storage states. However, even if a memory cell has been subjected to multiple data overwrite and/or erasure cycles, a sophisticated attacker may be able to use a variety of laboratory techniques to recover the previously stored data from the medium.

Many existing secure erasure techniques can be time and power consuming, and in some cases can significantly reduce the remaining operational life of the memory. Some types of flash memory cells that store data in a multi-level cell (MLC) configuration may be initially limited to a total number of around 5,000 erasure cycles. Thus, conventional secure erase operations that involve numerous repeated erasures may tend to significantly reduce the lifetime of the device, and may not fully secure the device from informational leakage.

A user may wish to remove all copies of a particular data set while leaving other stored data in the memory unaffected and available for future retrieval. Such selected erasure operations can present particular challenges if multiple copies of the data set to be sanitized are distributed throughout the memory array.

Accordingly, various embodiments of the present invention are generally directed to a method and apparatus for carrying out a secure erasure of data from a memory. As explained below, the secure erasure may commence responsive to an internally or externally generated trigger event. An extended data set to be securely erased is identified, and a methodology for carrying out the erasure is selected in relation to a characterization of the data. The data are thereafter securely erased using the selected methodology.

The secure erasure operations disclosed herein can be used in a number of different types of memory devices, such as solid-state non-volatile memory arrays including but not limited to flash memory, spin-torque transfer random access memory (STRAM), resistive random access memory (RRAM), and programmable logic cells (PLCs). The various approaches can also be adapted to other types of storage media such as but not limited to magnetic recording discs and hybrid devices.

These and other features can be understood beginning with a review of FIG. 1 which generally illustrates an exemplary data storage device 100. The device 100 includes a controller 102 and a memory module 104. The controller 102 provides top level control for the device 100 and may be configured as a programmable processor with associated programming in local memory.

The memory module 104 can be arranged as one or more non-volatile memory elements such as rotatable recording discs or solid-state memory arrays. While a separate controller 102 is shown in FIG. 1, such is merely exemplary. In alternative embodiments, the controller functions are incorporated directly into the memory module.

While not limiting, for purposes of the present discussion it will be contemplated that the data storage device 100 is a solid-state drive (SSD) that utilizes flash memory cells in the memory module 104 to provide a main data store for a host device (not shown). The host device can be any device that communicates with the storage device 100. For example, the storage device may be physically incorporated into or connected directly to the host device, or the host device may remotely communicate with the storage device via a network using a suitable protocol.

Figure 2:
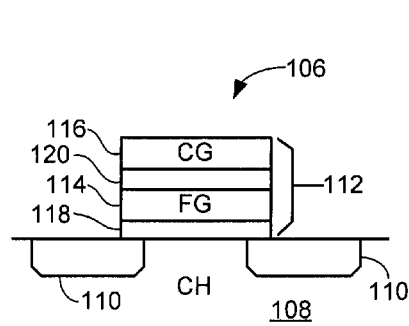
FIG. 2 shows a flash memory cell construction that can be used in the device of FIG. 1.

FIG. 2 illustrates an exemplary flash memory cell 106 of the memory module 104 of FIG. 1. The memory cell 106 as shown in FIG. 2 is formed on a semiconductor substrate 108 having spaced apart n+ doped regions 110. A gate structure 112 spans the pair of adjacent doped regions so that the flash cell 106 takes a general nMOS transistor configuration. A series of adjacent flash cells can be formed in a NAND configuration with a gate structure 112 spanning each adjacent pair of doped regions 110.

Each gate structure 112 provides an alternating stack of electrically conductive gates 114, 116 and electrically insulative regions 118, 120. Data are stored by each cell 106 in relation to the relative amount of electrical charge stored on the lower gate 114, which is characterized as a floating gate (FG).

The FG 114 accumulates charge during a programming operation by the selected application of appropriate voltages to the adjacent doped (drain and source) regions 110 and the upper gate 116, characterized as a control gate (CG). These applied voltages induce the controlled migration of electrical charge from a channel (CH) portion of the semiconductor substrate 108 to the FG 114 across insulative region 118.

In an initial erased state, there will be substantially no accumulated charge on the FG 114. In this state, the cell will exhibit drain-source conductivity across the channel CH without the application of voltage to the CG 116. Once charge has been accumulated on the FG 114, the drain-source path will be non-conductive unless a sufficiently high gate control voltage is applied to the CG 116, at which point the cell becomes conductive. The programmed state of the cell 110 can be determined by observing the level of CG voltage required to allow drain-source current to pass through the cell, which generally correlates to the amount of accumulated charge on the FG 114.

The cells 106 can be configured as single-level cells (SLCs) or multi-level cell (MLCs). An SLC flash cell stores a single bit; a normal convention is to assign the logical bit value of 1 to an erased cell (substantially no accumulated charge) and a logical bit value of 0 to a programmed cell (presence of accumulated charge). An MLC flash memory cell stores multiple bits, such as two bits. Generally, n bits can be stored using $2^n$ storage states. A normal convention is to assign a multi-bit logical value 11 to an erased cell with charge C0 (substantially no accumulated charge), and then sequentially assign multi-bit logical values 10, 01 and 00 to increasingly higher charge levels C1, C2 and C3 where C0<C1<C2<C3.

A special erase operation is generally required to remove accumulated charge from the FG 114. An erasure can be carried by the application of a relatively high voltage to the CG 116 to cause migration of the charge from the FG 114 back to the channel across region 118. A different set of voltages may be applied to the cell 106 to thereafter add charge to the FG 114 during a data write operation.

Figure 3:
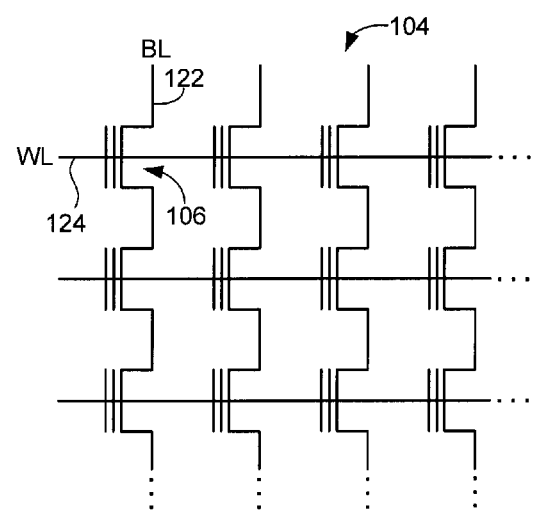
FIG. 3 is a schematic depiction of a portion of a flash memory array using the cells of FIG. 2.

The memory cells 106 can be arranged in the memory module 104 as an array of rows and columns of the memory cells, as depicted in FIG. 3. Each column of cells can be coupled via one or more bit lines (BL) 122. The control gates (CG) 116 of the cells 106 along each row can be interconnected via individual word lines (WL) 124.

Figure 4:
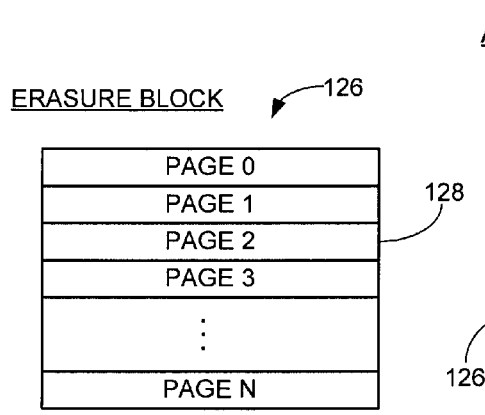
FIG. 4 illustrates a format for an erasure block.

The array of memory cells 106 shown in FIG. 3 may be grouped into erasure blocks 126, as depicted in FIG. 4. Each erasure block 126 is a separately addressable block of memory and represents the smallest unit of memory that can be concurrently erased at a time. Each row of cells is referred to as a page 128, and each page is configured to store a selected amount of user data. An exemplary block size may be 128 pages of memory, with 8192 (8 KB) bytes per page. Other sizes and configurations can be used.

Block-level wear leveling may be employed by the controller 102 to track the erase and write status of the various blocks 126. New blocks will be allocated for use as required to accommodate newly received data. In at least some embodiments, a full page's worth of data is written to each page at a time. Multiple user data sectors of data (each having an associated logical address, such as a logical block address, LBA) may be written to the same page, and a given LBA's worth of data may be physically stored so as to span multiple pages. Filler bits may be appended to a selected set of input data if a full page worth of data is not supplied for writing in a given write operation. Error correction codes such as parity bits may be incorporated at the page level to correct errors as a full page worth of data is retrieved. Metadata and other control information may be stored in each erasure block 126, or stored elsewhere such as in specific blocks dedicated to this purpose.

If data for a particular LBA are presently stored in a first page with a first physical address and the device 100 receives a write command to write new, updated data for that LBA, the controller 102 may select a second, new page with a different physical address to store the updated data and mark the LBA data in the first page as older (stale) data. When all of the data in a page are superseded, the page is marked for erasure. When enough pages in a given block are marked for erasure, a garbage collection (GC) operation may be scheduled in the background to copy current version data to a new block and to erase the existing block.

Figure 5:
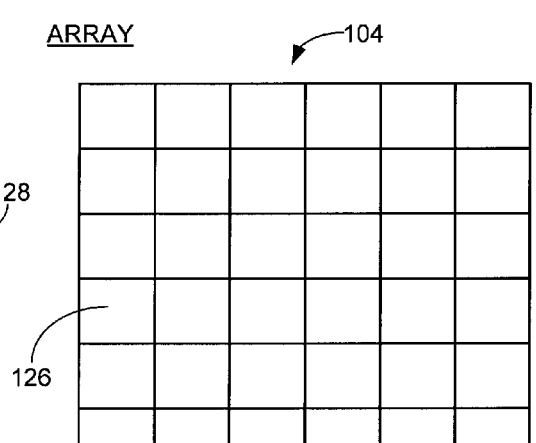
FIG. 5 is an exemplary arrangement of erasure blocks from FIG. 4.

FIG. 5 shows a portion of the memory array 104 as a grouping of erasure blocks 126 from FIG. 4. It is contemplated that the memory array 104 may include any number of such blocks, including blocks on different dies, strips, planes, chips, layers and arrays. Each of the erasure blocks 126 may be separately erasable. The system maintains control information for each erasure block, such as a total number of erasures, date stamp information relating to when the various blocks have been allocated, etc. The controller 102 may group multiple sets of the erasure blocks into larger, multi-block garbage collection units (GCUs) which are then allocated and erased as a unit.

Overprovisioning techniques can be used by the device 100 so that a larger number of erasure blocks 126 are provided in the array as compared to the specified total data capacity of the device. For example, a storage device rated at 2 terabytes, TB ($2 \times 10^{12}$ bytes) of user data storage capacity may have a greater amount of total capacity, such as 4 TB, but may only report the lower capacity value to the user. The provisioning of "extra" blocks enhances the ability of the device 100 to carry out garbage collection and wear leveling operations to maintain performance levels and operational life of the device.

Figure 6:
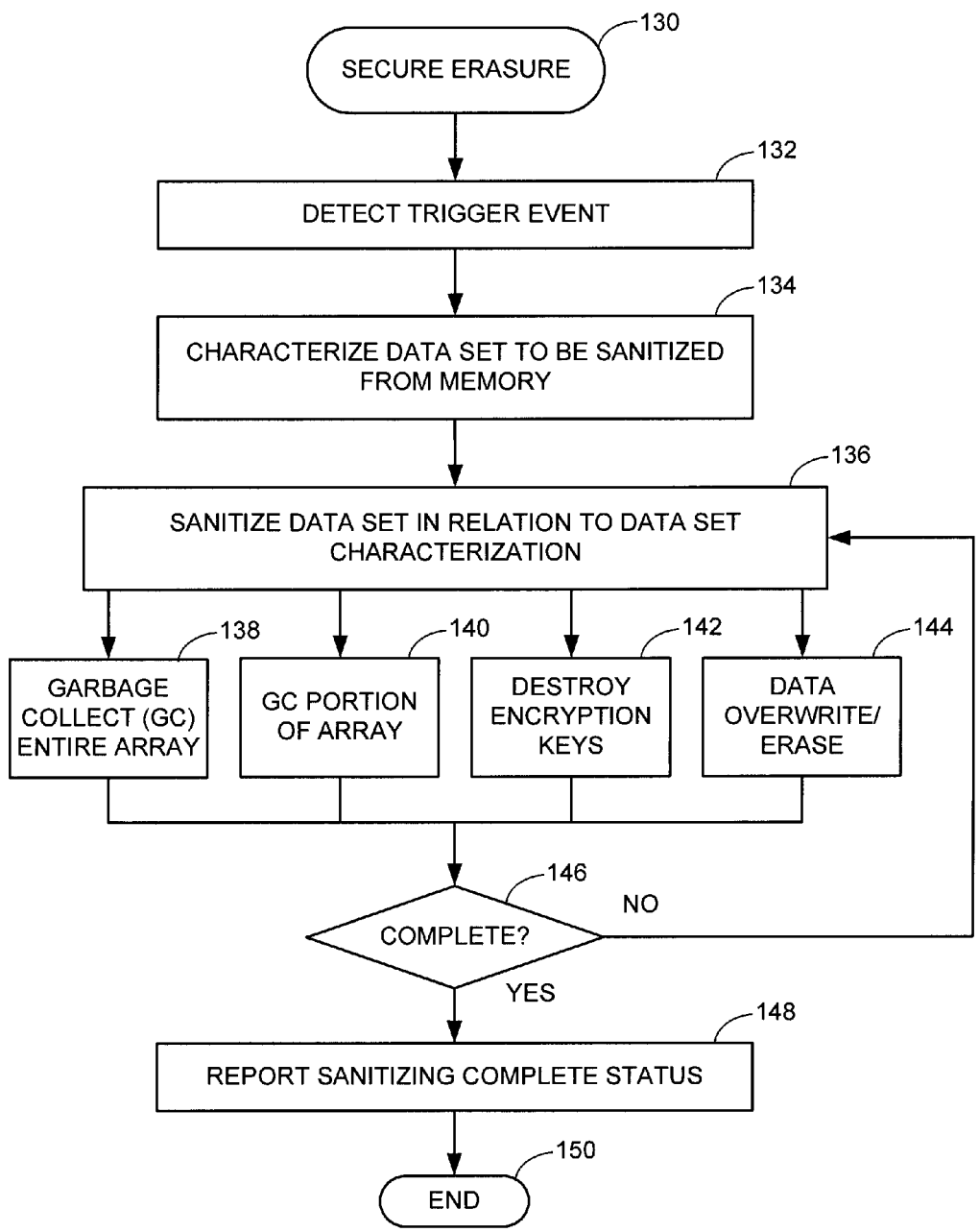
FIG. 6 is a flowchart for a SECURE ERASURE routine illustrative of exemplary steps that may be carried out in accordance with various embodiments of the present invention.

FIG. 6 sets forth a SECURE ERASURE routine 130, illustrative of steps carried out by the device 100 in accordance with various embodiments of the present invention to securely erase an extended data set from memory. The extended data set comprises multiple copies of selected data that share a common logical address (e.g., a selected range of LBAs) that are stored in different physical addresses in the memory. The secure erasure is operable to purge the extended data set while retaining other, previously stored data in the memory.

It is contemplated that the purging of the extended data set will be characterized as a non-destructive purge of the data so that the physical locations associated with the extended data set can be thereafter used to store new data. However, in some embodiments, the purging operation can be a destructive purging operation so that at least some of the physical locations in which the extended data set are stored are damaged so that the locations cannot be used to successfully store new data. This latter approach can be useful, for example, in destroying data associated with one user or host system while leaving data associated with other users and/or host systems intact. In some embodiments, the physical location(s) where encryption key(s) and the like are stored can be damaged during the destructive purging operation.

The various steps shown in FIG. 6 will be discussed in detail below. It will be appreciated that other sequences of steps can be utilized depending on the requirements of a given application, so that the various steps in FIG. 6 are merely exemplary and may be omitted, modified and/or appended. In some embodiments, the routine represents control programming of the controller 102 that runs in the background during normal device operation and is initiated when required.

The secure erasure routine 130 may be initiated responsive to a trigger event, as denoted by step 132. A trigger signal indicative of the triggering event can be internally or externally generated. For example, an external data purge command may be supplied by a host device that identifies one or more LBAs to be securely erased from the device. Alternatively, internal monitoring circuitry may detect the occurrence of a certain event that serves to trigger the secure erasure operation. Examples include but are not limited to a timeout condition, a data accumulation level, an unauthorized attempted access by a third party, an unscheduled power down event, an aging status of the memory, etc.

A data set to be securely erased is identified and characterized at step 134. This step can be carried out at a file level or a block sector level. The data set can be expressed as an identified range of LBAs to be sanitized (e.g., LBAs 100-199). The data set is referred to as an extended data set and includes all copies of the identified range of logical blocks in the system. The characterization of the extended data set during step 134 can be carried out in a variety of ways, and generally takes into account the expected cost of the sanitizing operation in terms of system requirements.

In at least some embodiments, the size of the extended data set (e.g., the total amount of data to be erased) is one cost factor that is taken into account in deciding which of several available sanitizing operations to apply. Other cost factors may be considered, such as the age or state of the memory cells storing the data to be sanitized, the elapsed time since the last occurrence of a data update event, a total number of accumulated copies of a particular data set that have been stored in the memory, the type of data to be sanitized (e.g., top secret data), and so on. In some embodiments, all copies (including revisions) of a particular data set will be purged. In other embodiments, the most current version is retained in the memory at the conclusion of the data sanitizing operation.

The routine continues at step 136 to sanitize the data in response to the characterization of step 134. Various alternative sanitizing operations can be made available to the system. These include a garbage collection (GC) operation upon the entire array, step 138; a GC operation on a portion of the array, step 140; the destruction of one or more encryption keys, step 142; and a cyclical data overwrite/erase sequence, step 144. Other sanitizing operations can be carried out so that these are merely exemplary and not limiting. Different sanitizing operations can be sequentially applied, as indicated by the return path through decision step 146. Once the sanitizing operation has been completed, a process complete status may be reported, step 148, and the process concludes at step 150.

Figure 7:
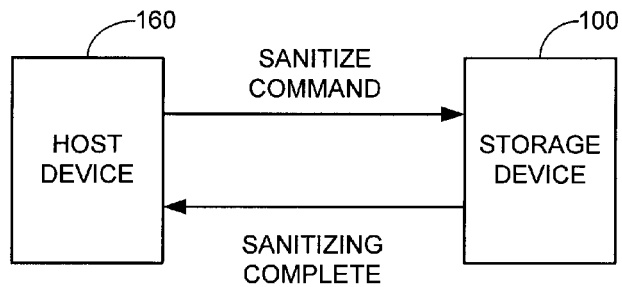
FIG. 7 is a basic functional block diagram illustrating data exchanges between a storage device and a host device.

FIG. 7 shows the storage device 100 operably coupled to a host device 160. In some embodiments, the host device can issue an externally generated sanitize command to the storage device to trigger the sanitizing operation, as set forth by step 132 of FIG. 6. The command can include a designation of a file name, or can identify a range of LBAs to be sanitized. FIG. 7 shows the device 100 providing a process complete status back to the host device 160 when the secure erasure has been completed, as provided by step 148 in FIG. 6.

Figure 8:
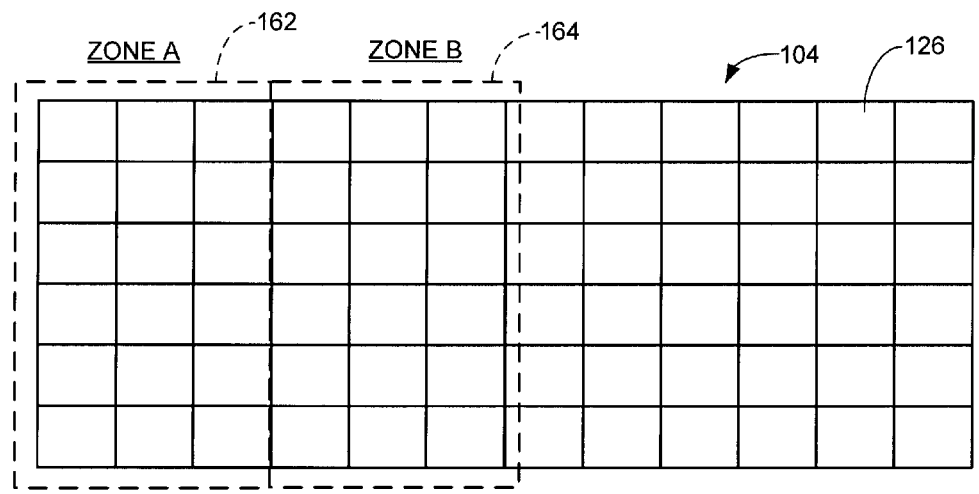
FIG. 8 shows a manner in which a data storage array may be divided into multiple zones.

FIG. 8 illustrates the partitioning (dividing) of the memory 104 into a plurality of zones (bands). Two such exemplary zones, Zone A and Zone B, are denoted at 162 and 164. Different ranges or classifications of data may be stored in different zones. The host device 150 (FIG. 7) can be configured to identify certain data as confidential user data having a relatively higher security level than other, standard user data, and can segregate the confidential user data in a selected zone such as Zone A. Such data segregation can reduce the amount of effort required during garbage collection operations to securely erase the various copies of the data, since only those erasure blocks in a particular zone need be referenced during the routine.

The zones in FIG. 8 may be user configurable. In some embodiments, the storage device 100 can be adapted to transfer a request to the host for configuration information. The host may specify the total amount of storage space to be made available to the host for the storage of confidential data sets, on a total storage space size basis (e.g., 100 megabytes, MB) or percentage basis (e.g., 5% to 50% of the total available storage space). Additionally or alternatively, the parameters may be selected in terms of one or more LBA ranges that are agreed-to up front as constituting confidential data ranges. In further embodiments, data from different host devices may be stored in different respective zones in the array.

Figure 9:
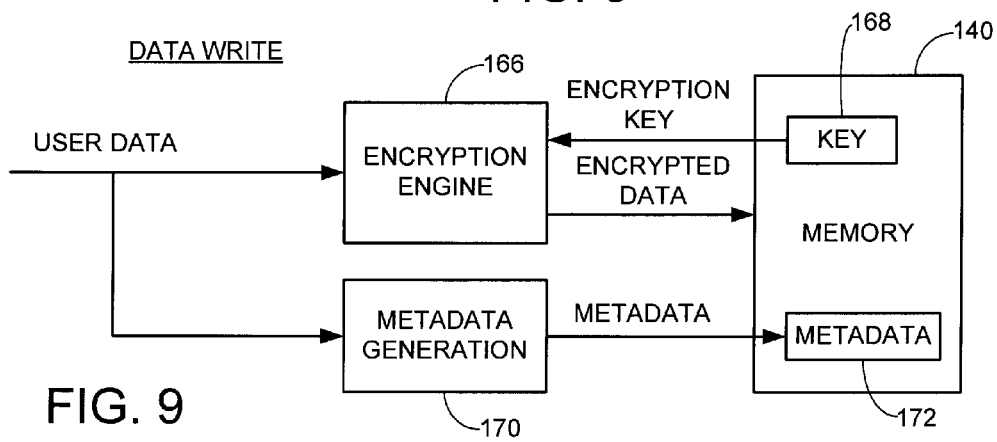
FIG. 9 sets forth an exemplary data write sequence in which data are encrypted prior to storage in a memory array.

In some cases, the data may be encrypted prior to storage in the memory 104. FIG. 9 shows an encryption engine 166 which applies a selected algorithm (cipher) using special information (an encryption key) to scramble the received user data. The encryption key may be stored in a special memory location 168 in the memory 104, or elsewhere in the device 100. The encryption can take any number of forms, including multi-level encryption.

Any suitable keys can be used, including internally and/or externally generated keys, band keys, etc. In some embodiments, the LBA value(s) associated with the data may be used in the encryption algorithm as a seed value or other input data. Once the data are encrypted, the encrypted data are written to memory 104. The data may be stored as a single copy, or multiple duplicate copies may be stored in different locations within the memory 104. The same encryption key may be used for all data stored to a particular zone in FIG. 8 (a "band key"). A unique encryption key may be provided for each data set.

Continuing with FIG. 9, metadata are generated by a metadata generation block 170. The metadata provide control data to track the user data and can take any suitable form. In some embodiments, the metadata identify the physical address (array, erasure block, page, starting bit, etc.) of the cells to which the encrypted data are stored. The metadata can also identify the LBA value(s) associated with the stored encrypted data and other information such as time stamp data associated with the write event, etc. The metadata are stored in a metadata memory location 172, such as at the end of each erasure block storing the corresponding encrypted user data or in one or more specially designated metadata erasure blocks. The metadata can be stored in any other suitable location, such as a separate non-volatile memory. During operation, the metadata can be swapped into a local memory of the device for access by the controller.

The host device 160 in FIG. 7 may issue a read command to the storage device to retrieve a previously stored data set. In such case the storage device 100 will use the metadata to locate the most recently stored data set, apply decryption to remove the encryption encoding, and transfer the recovered data set to the host device. The host device 160 may revise the data set and then write this new version back to the storage device using a write command. When the storage device receives the updated data set, the processing of FIG. 9 will be carried out to encode and store this newer copy of the data set to a different location in the memory. The new data may be written to the same erasure block, or to a different erasure block. New updated metadata may also be generated. Metadata management techniques can be utilized to flag the previous copy as older (stale) data.

Figure 10:
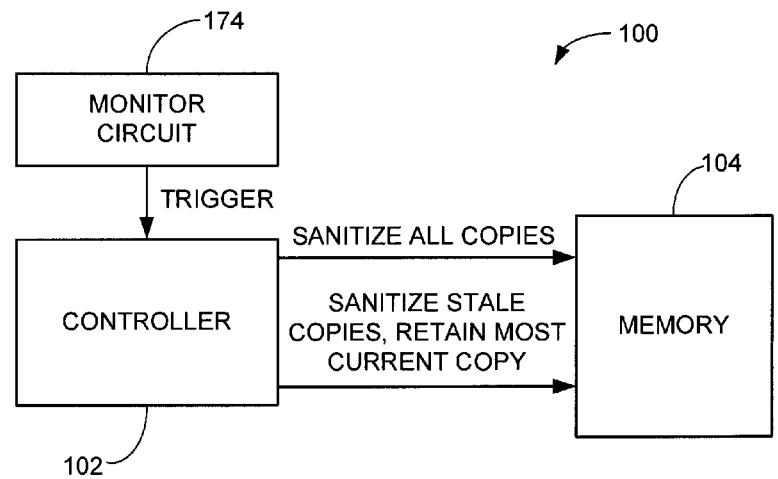
FIG. 10 shows the use of a monitor circuit which generates an internal trigger signal to commence a sanitizing operation.

FIG. 10 illustrates the use of an internal monitor circuit 174 of the storage device 100. The monitor circuit 174 can be realized in a separate hardware circuit or incorporated into the controller functionality. The monitor circuit 174 provides an internal trigger signal to the controller 102 to initiate a sanitizing operation. This may result in the secure erasure of all copies of a particular range of LBAs from the memory 104. Alternatively, the most current version of the data may be retained in memory while all (or some) of the older, stale copies of the data are purged.

In some embodiments, the monitor circuit tracks the total number of copies (including identical copies and changed revisions) of particular LBAs. This can be carried out on an individual LBA basis or on an LBA grouping basis. The monitor circuit 174 can establish an upper maximum acceptable number of copies. Once this threshold is reached, some number of older versions of the data are purged. In some cases, some maximum number X of older copies, such as X=5, etc., are retained. The oldest may be purged, or those copies most conveniently erased are purged. In other embodiments, all copies except the most current are purged.

The monitor circuit can further be adapted to track host activity. Data sets that have not experienced host I/O accesses after a selected amount of time may be subjected to partial purging. In another embodiment, the monitor circuit 174 may monitor elapsed time since host communication has last taken place. If a significant amount of time has passed, the device may initiate the purging of at least some older copies in anticipation of the need to purge other copies in the near future. In still further embodiments, detection of an unauthorized power-down, or some other out-of-band signaling event, may result in the triggering of a secure erasure of selected data sets.

Figure 11:
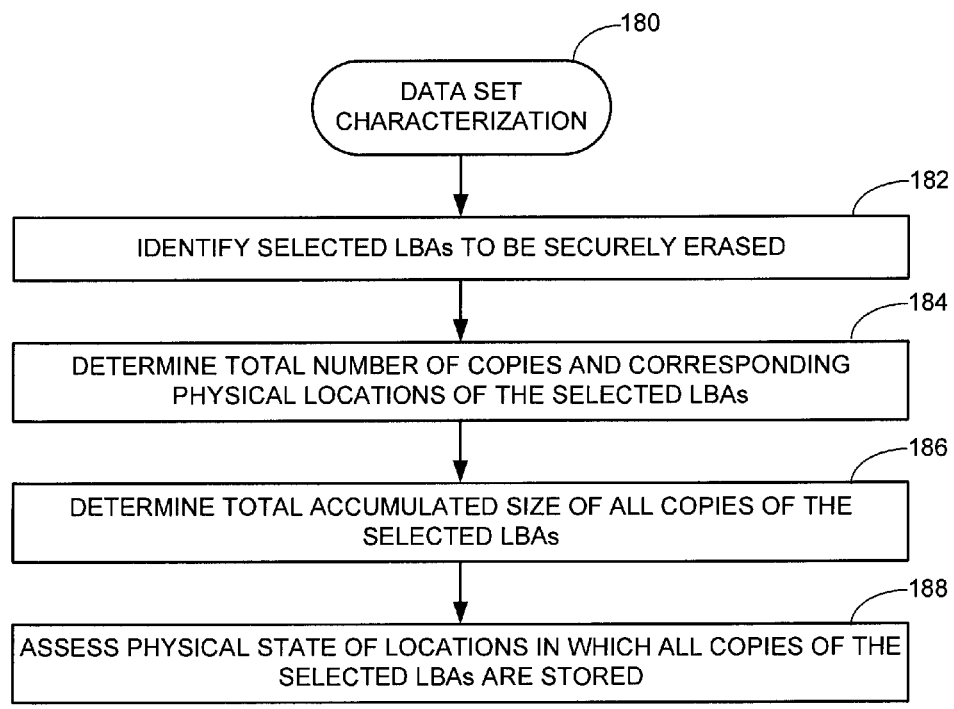
FIG. 11 provides a flow chart for a DATA SET CHARACTERIZATION routine.

FIG. 11 provides a DATA SET CHARACTERIZATION routine 180 suitable for use during step 134 of FIG. 6 responsive to an external or internal trigger such as provided in FIG. 7 or 10. A variety of characterization steps can be carried out depending on the circumstances, so these are merely illustrative. In FIG. 11, the selected LBAs to be securely erased are identified at step 182. It will be appreciated that other types of logical addressing can be used besides host-level LBAs to identify the data. It will be noted that multiple copies of the same data will tend to have the same logical addressing and different physical addressing within the memory array 104 although such is not necessarily required.

At step 184, the total number of copies of the selected LBAs, and the physical locations where these copies are stored, are next determined. A suitable metadata control mechanism can be used to determine this information. An exemplary scheme to perform these actions is discussed below.

The total accumulated size of the expanded set of data is next determined, as indicated by step 186. Different data sanitizing measures are employed depending on this overall size. Should the total amount of data exceed a first selected threshold, such as, for example, 5% of the total available data capacity, the system may proceed to perform a garbage collection (GC) operation on the entire system, thereby also purging all copies of all stale data in the system in the process. In other embodiments, if the total amount of data to be sanitized is below a second, lower threshold, then a different approach may be selected, such as a localized data overwrite or encryption key destruction operation.

At step 188, another factor that may be taken into account is the physical state of the locations in which the expanded data set is stored. For example, locations that have received a relatively greater number of write/erase cycles may receive a different data sanitizing effort than locations that have received a relatively lower number of write/erase cycles. These efforts can be used to extend the useful operational life of the array. A variety of other factors can be used as well, such as temperature, data sequencing, data type, current available remaining data capacity in the device, etc.

From FIG. 11 it can be seen that the device 100 tailors the secure erasure approach(es) used to securely erase the expanded data set in view of these and other characterization factors. Some of the available secure erasure approaches will now be presented in greater detail.

Figures 12, 13, 14:
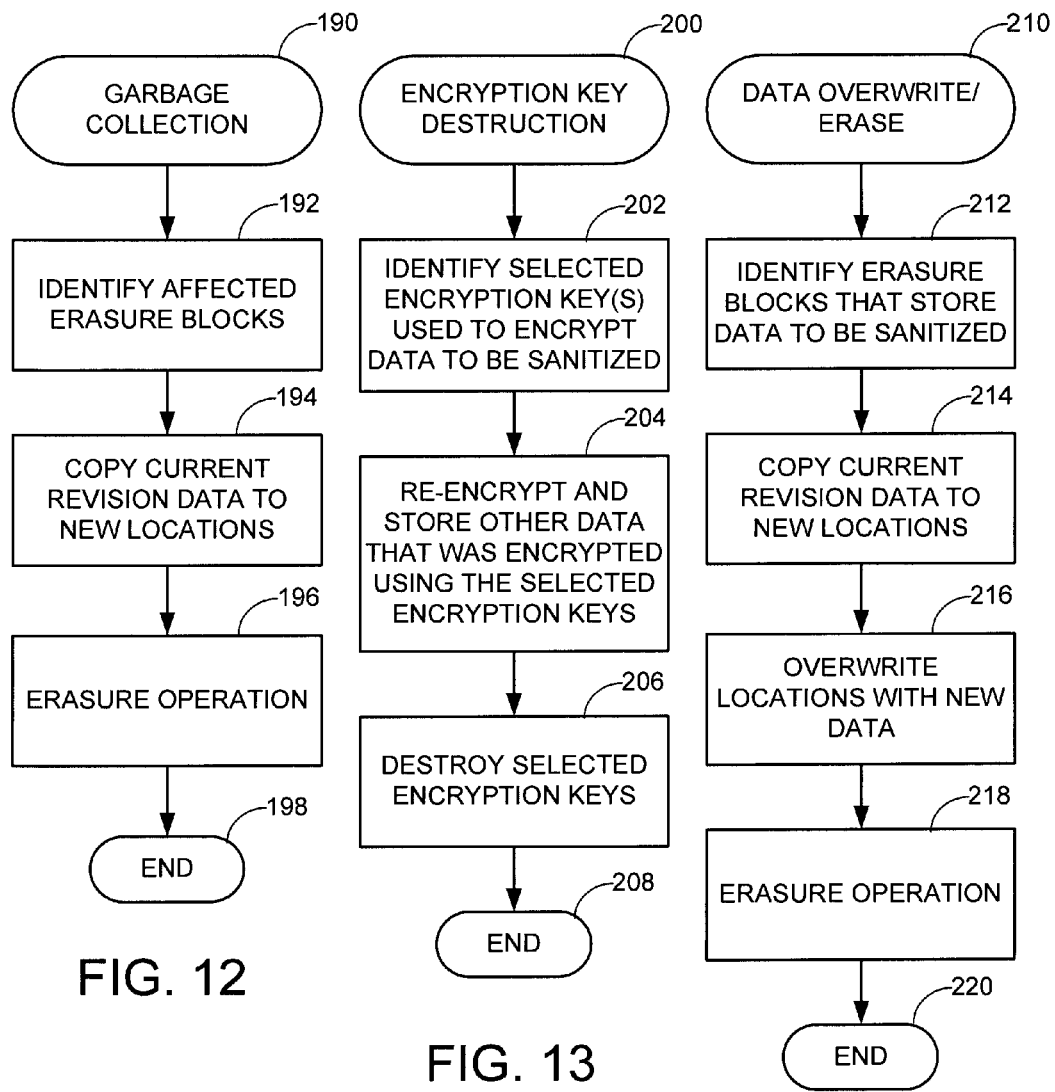
FIG. 12 is a flow chart for an exemplary GARBAGE COLLECTION routine.
FIG. 13 presents a flow chart for an exemplary ENCRYPTION KEY DESTRUCTION routine.
FIG. 14 provides a flow chart for an exemplary DATA OVERWRITE/ERASE routine.

A GARBAGE COLLECTION routine 190 is set forth by FIG. 12. The garbage collection (GC) of FIG. 10 can be carried out during steps 138 and 140 of the routine of FIG. 6 to carry out garbage collection on the entire memory array 104, or on a subset of the array, such as one or more zones as shown in FIG. 8.

At step 192, the affected erasure blocks 126 (FIG. 5) having stale copies of data to be subjected to the garbage collection operation are first identified. Current revision data are read out of these blocks and copied to new locations, at step 194, which may be one or more other erasure blocks that do not store stale data and will therefore not be subjected to the GC operation. The relocated data may be decrypted and then re-encrypted using a new encryption key suitable for the new location. An erasure operation is thereafter performed on the selected blocks at step 196. This may include the application of the reverse voltage discussed above in FIG. 2 to all of the memory cells in the erasure block to return the memory cells to an initial, unprogrammed state (e.g., logical 1, logical 11). The routine then ends at step 198.

An ENCRYPTION KEY DESTRUCTION routine 200 is shown by FIG. 13. This alternative secure erasure approach generally corresponds to step 142 in FIG. 6. In this approach, the encryption key(s) used to encrypt the data to be securely erased are overwritten or otherwise erased, thereby reducing the ability of an attacker to recover the encrypted data. The encrypted data itself may or may not also be overwritten or erased, as desired.

At step 202, the encryption key(s) used to encrypt the data are first identified. These keys may be stored in the array, such as shown in the encryption key area 168 in FIG. 9, or may be stored elsewhere in the device 100. In some cases, the encryption keys will be applied to the stored user data on a zone basis as shown in FIG. 8. At step 204, other data not subjected to the secure erasure operation and which have been encrypted with the selected key(s) identified in step 202 will be decrypted, re-encrypted using one or more new, different keys, and then stored in a suitable location.

Thereafter, the selected key(s) for the expanded data set are destroyed at step 206. This can be carried out by overwriting the memory cells that store the selected keys with new data, such as all logical 0's, or some other value. Random values can also be written over these cells to thereby mask the previous state. Additionally or alternatively, a garbage collection operation can be performed to read out data from the erasure block storing the selected keys, erasure of the entire block, and then the rewriting of the read out data back to the erasure block. As desired, the encrypted data can also be overwritten and/or erased at this time. The routine then ends at step 208.

FIG. 14 shows a DATA OVERWRITE/ERASE routine 210. This provides yet another available secure erasure approach, and corresponds to step 144 in FIG. 6. As before, the erasure blocks having data to be sanitized are identified, step 212, and current revision data not subjected to the secure erasure operation are copied to new locations, step 214.

A data overwrite process is applied at step 216 to the memory cells storing the data to be sanitized. As in FIG. 13, the overwritten data can take a number of forms, such as writing all logical 0's (or "00") to these locations, writing bit inverted data to these locations, writing random values to these locations, and so on. Once overwritten, the processing may end, or the erasure blocks can be subjected to an erasure operation at step 218. As desired, steps 216 and 218 can be sequentially repeated multiple times. The routine then ends at step 220.

In some embodiments, the metadata system used to track stored user data is modified to enhance the identification of the expanded data set during the flow of FIG. 11. This can be understood beginning with a review of FIG. 15, which incorporates descriptor information into each page of memory in the array 104 (see e.g., page 126 in FIG. 4).

Figure 15:
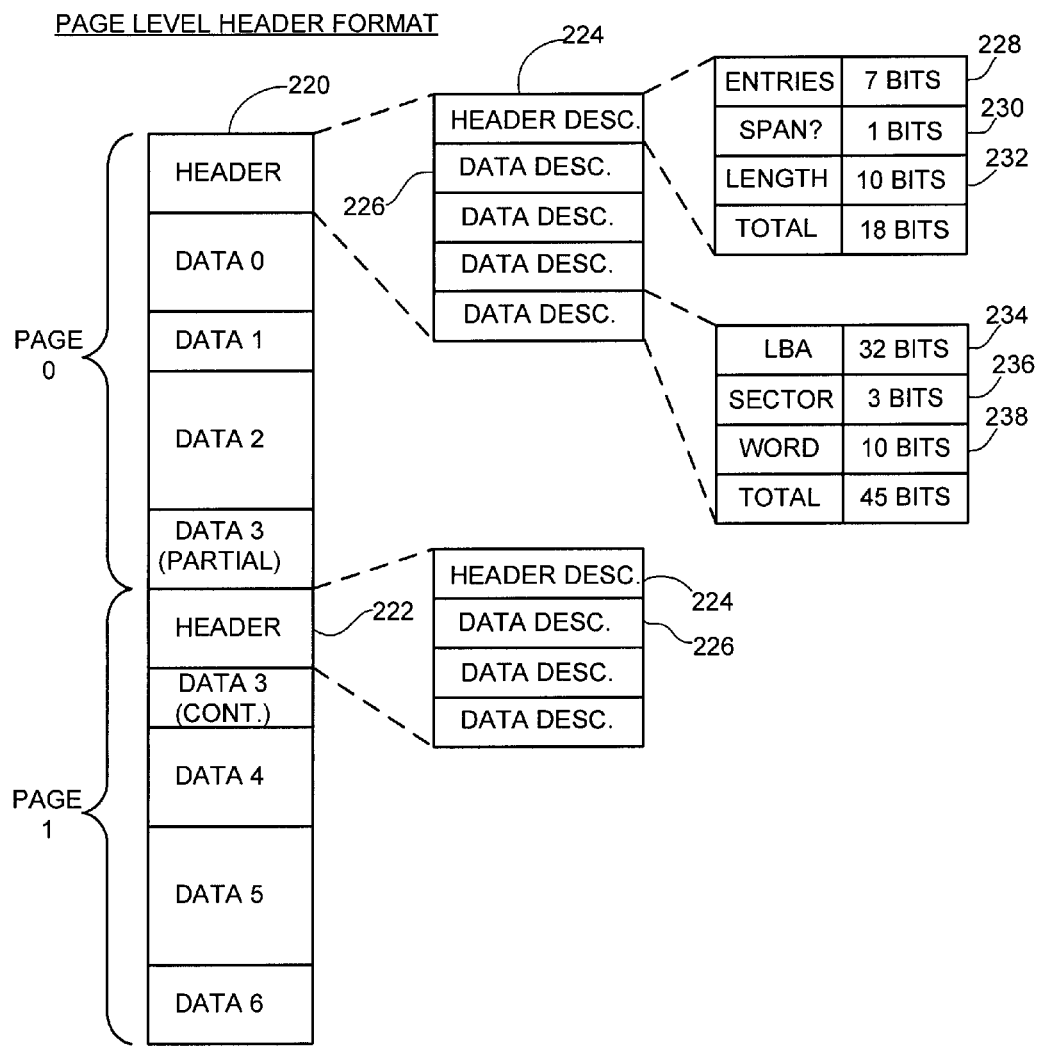
FIG. 15 is an exemplary page level header format that can be used with some embodiments.

FIG. 15 shows two exemplary pages identified as Page 0 and Page 1. A header field 220 is inserted at the beginning of Page 0, and a header field 222 is inserted at the beginning of Page 1. Similar header fields are appended to each page of memory used to store user data. Each header field 220, 222 will be formed at the time of the writing of data to the associated page, and will have a length determined in relation to the number of data blocks (e.g., sectors) written to that page. It will be appreciated that each data block will have a physical address (e.g., erasure block, page number, bit location, etc.) as well as a logical address (e.g., an LBA). These data blocks are denoted as Data 0-6 in FIG. 15. It will be noted that the Data 3 data block is wrapped across Pages 0-1, so that a first portion of the block appears in Page 0 and the remainder appears in Page 1.

The header field 220 for Page 0 includes a header descriptor field 224 and a plurality of data descriptor fields 226. Each data descriptor field 226 corresponds to a different one of the data blocks written to that page. Thus, header field 220 is shown to have four descriptor fields 226, whereas header field 222 has only three descriptor fields.

The header descriptor field 224 includes an entries field 228 (7 bits), a spanning field 230 (1 bit), and a length field 232 (10 bits). The entries field 228 identifies the total number of blocks written to the page (in this case, four). The spanning bit 230 indicates whether the last data block is a partial block (in this case, yes). The length field 232 indicates the total overall length of the header field 220 (in this case, 198 bits), thereby signaling the first bit location of the first data block (Data 0).

The data descriptor fields 226 each include a logical address field 234 (32 bits) to provide a logical address value (e.g., the LBA value) of the associated data block. A sector length field 236 (3 bits) indicates sector length, and a word length field 238 (10 bits) indicates word length. Other formats can readily be used. A quick scan of the header data in each page can provide an immediate indication of which LBAs are stored in each erasure block. If data are written to each erasure block (or more generally, each GCU) in order beginning with the first page, then the relative aging of different copies of the same LBA in the same GCU can be easily determined. More recent versions of a particular LBA will occur lower within the structure, and older, less versions of the LBA will occur higher within the structure.

Figure 16:
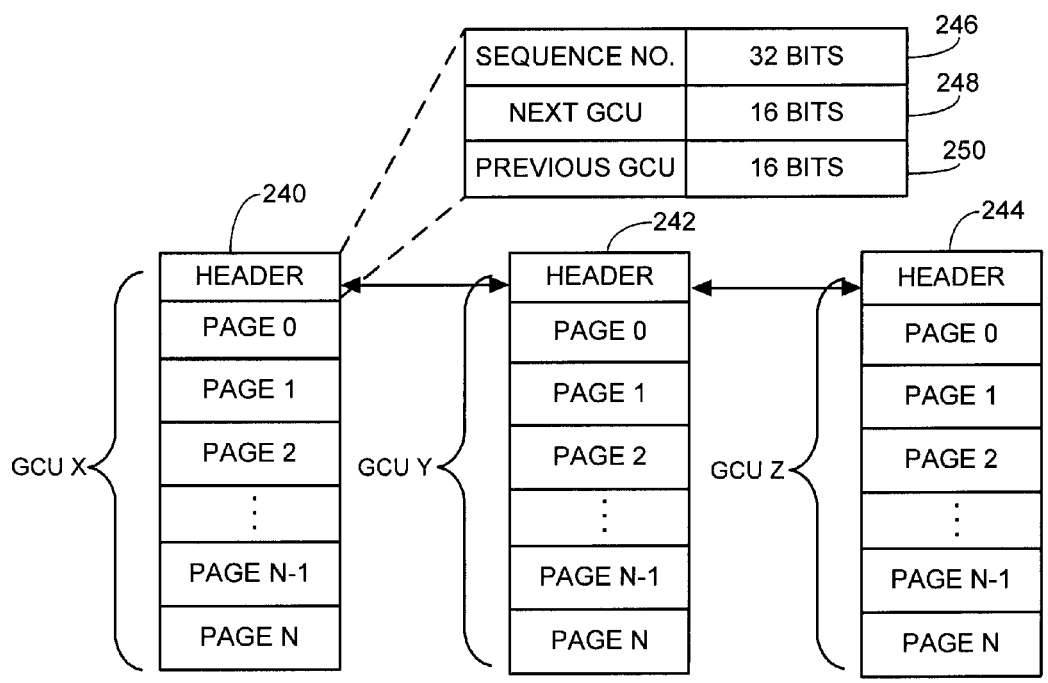
FIG. 16 shows an exemplary garbage collection unit (GCU) level header format that can be used with some embodiments.

FIG. 16 provides a corresponding mechanism to track relative aging of different GCUs. FIG. 16 shows three exemplary GCUs labeled as GCU X, Y and Z. Each has the same number of pages (e.g., Page 0-N), although such is merely exemplary. Each of the GCUs is provided with an initial GCU header field, respectively denoted at 240, 242 and 244. Each GCU header field has a common format which includes a sequence number field 246 (32 bits), a next GCU field 248 (16 bits) and a previous GCU field 250 (16 bits). Other formats can be used.

The sequence number field 246 stores a sequence value indicative of when the associated GCU was last allocated. The sequence value can include a time/date stamp, a simple incremented count number, etc. The next GCU field 248 identifies the next GCU that was allocated after the current GCU, and the previous GCU field 250 identifies the GCU that was allocated previously to the allocation of the current GCU. In this way, a quick scan of the GCU header fields 240, 242 and 244 can indicate in which order the GCUs X, Y and Z were allocated (and potentially, when), with the next GCU and previous GCU fields serving as pointers.

In some embodiments, the GCU sequence number will be uniquely incremented each time a new GCU is allocated and used by the system. This count will be unique among all the other GCUs in the system at any moment in time, and will be unique each time the same GCU is erased and placed back into service to receive new data.

This sequence number can be used to determine the freshness of the data, and which is the most recent location for the data. For example, the GCU with the highest sequence number that stores a copy of a particular LBA will be understood to store the most current version of that LBA.

When a GCU is ready to be used by the system it will be erased and placed into an allocation queue. When the GCU becomes active, the previous GCU will be known from the end of the current sequence, and the next GCU will be known from the head of the ready queue. If there are multiple GCUs in operation simultaneously the order can be derived from the time of selection from the ready queue. A GCU remains active until all the physical pages within it are filled with data, and another GCU is selected from the ready queue.

Figure 17:
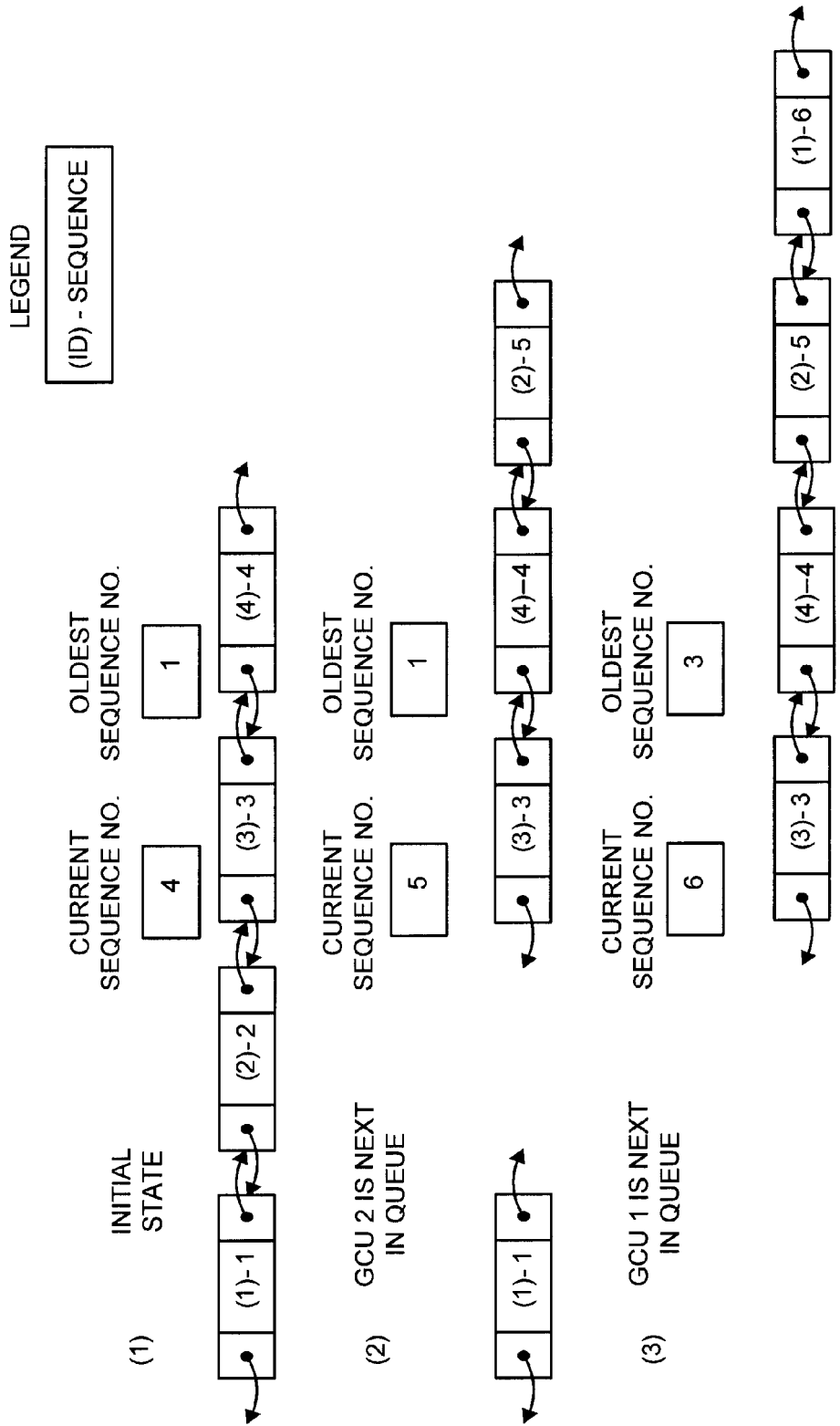
FIG. 17 is a GCU sequence ordering diagram useful with the formats of FIGS. 13 and 14.

FIG. 17 illustrates an exemplary manner in which the GCU header information from FIG. 16 can be used to track GCU ordering over time. At an initial state (1), four GCUs 1-4 have been allocated in that order, with GCU 1 being the oldest and GCU 4 being the newest.

At a subsequent point in time at state (2), all (or at least most) of the data in GCU 2 previously become stale. A garbage collection operation was performed to erase GCU 2 and reallocate it as the most recently allocated GCU in the sequence (e.g., the fifth GCU). The GCU ordering at state (2), from oldest to newest, is GCU 1, 3, 4, 2. At a still further point in time at state (3), similar processing was applied to GCU 1 so that GCU 1 was subjected to a garbage collection operation and has now been placed into service as the sixth allocated GCU. The GCU ordering at state (3), from oldest to newest, is GCU 3, 4, 2, 1.

Figure 18:
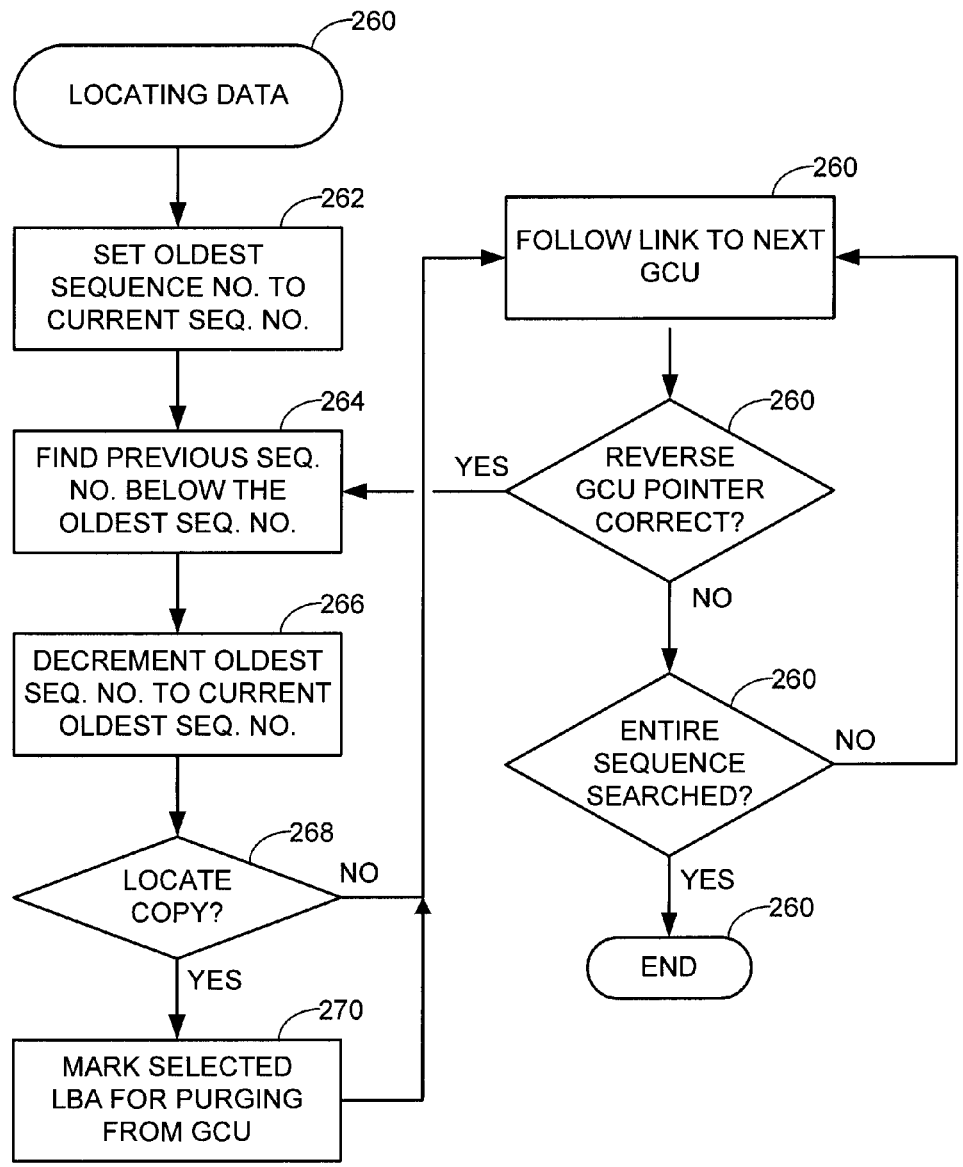
FIG. 18 is a flowchart for an exemplary SELECTED LBA LOCATION routine carried out in accordance with some embodiments.

FIG. 18 provides a LOCATING DATA routine 260 which uses the page level and GCU level header fields in FIGS. 15-17 to locate all copies of a particular LBA slated for secure erasure. While the routine is directed to identifying a single LBA, it will be appreciated that this processing can be applied concurrently for a selected range of LBAs to determine the extent of a selected extended data set. Generally, as set forth below, the routine endeavors to quickly identify and follow the GCU chain to ensure that all copies of the LBA(s) have been located.

At step 262, a variable referred to as the oldest sequence number is initially set to the current (most recent) GCU having a copy of the selected LBA. For example, the device can perform an internal read operation which will return the latest copy of the selected LBA. This starting GCU can be identified as the oldest sequence number.

Having located one end of the chain, the routine continues at step 264 to locate the next previous GCU in the sequence, and to set the oldest sequence number value to this next previous GCU, step 266. This GCU is searched using, for example, the header fields in FIG. 15 to determine whether a previous copy of the LBA is stored therein. This is represented by decision step 268. If so, this previous copy is marked for purging, step 270. In some embodiments, this copy may be purged at this time, although in other embodiments the location is merely marked for subsequent processing as discussed above.

The routine continues at step 272 by following the chain of GCU values to the next GCU, and a confirmation is made whether the reverse GCU pointer correctly points to the oldest sequence number GCU. This ensures that no breaks in the chain have been made. If correct, steps 266-272 are repeated, moving farther back into the chain to mark all copies of the selected LBA. Once the entire sequence as been searched, as indicated by step 274, the process ends.

It will be noted that, should an unresolvable break be found in the GCU chaining, other methods may be necessary to ensure that all copies of the selected LBA have been found. Such methods may require a more brute force approach whereby every GCU in the system is accessed and read to see if the selected LBA appears in the page header fields therein. Nevertheless, it is contemplated that in most cases the data chaining methodology will retain the desired integrity and the routine of FIG. 18 will allow efficient and thorough location of every single resident copy of a selected LBA in the system.

The purging of extended data sets as discussed above is readily adaptable to a variety of forms of memory, such as but not limited to magnetic discs, optical discs, hybrid devices (e.g., devices that utilize multiple types of non-volatile memory such as flash and disc), STRAM, RRAM, PLC and other types of non-volatile memories. The techniques can be applied to memories that do not require a separate erasure operation, such as memory cells that can be transitioned from any selected programmed state to any other available programmed state using normal write processing instead of a specially configured erasure operation. Thus, the terms "erasure," "secure erasure" and the like as used herein will be understood in accordance with the foregoing discussion to describe operations upon a memory to mask a previously written state without necessarily involving a separate erasure process that is distinct from a programming operation.

Figure 19:
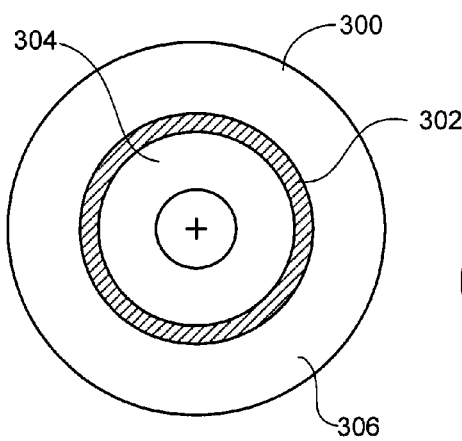
FIG. 19 shows a magnetic disc memory with which various embodiments of the present invention can be utilized.

FIG. 19 generally illustrates a rotatable recordable magnetic disc 300 on which a number of concentric tracks are defined to store user data in fixed sized blocks (sectors). Individual bands, respectively denoted at 302, 304 and 306, can be defined as desired to correspond to the zones, or bands, discussed previously in FIG. 8. In disc based storage systems (e.g., hard disc drives) that utilize multiple axially aligned disc recording surfaces on one or more discs, the zones can constitute a cylinder of axially aligned tracks through the stack, or can be one or more distinct zones at different radii on the various surfaces. It will be noted that one or more surfaces may not have any zones defined thereon.

Figure 20:
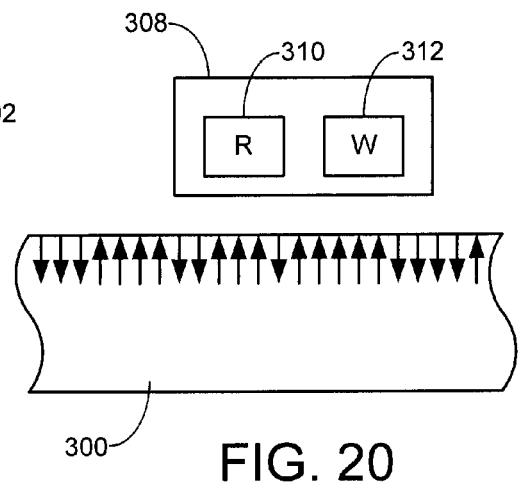
FIG. 20 illustrates a read/write transducer adjacent the disc memory of FIG. 15.

Disc memories such as 300 can be accessed by a moveable read/write transducer 308, FIG. 20, which may have separate read (R) and write (W) elements 310, 312 that are brought into close proximity to the rotating disc 300 during operation. The transducer 308 may be hydrodynamically supported adjacent the disc responsive to such rotation. The transducer 308 stores data to the disc 300 as a sequence of magnetic domains, which may extend along the media in a direction parallel to or perpendicular to the tracks.

A secure erasure operation as discussed herein can be applied to the magnetic disc 300. In some embodiments, to securely erase a selected set of data, the read element 310 can be positioned adjacent the associated track(s) on which the data sectors storing such data are located to recover the data stored thereto, and various overwrite operations can be employed, for example, a bit-inversion operation can be applied to the readback data and the write element 312 can be positioned adjacent the track during a subsequent revolution of the disc 300 to overwrite bit-inverted data. Similarly, other patterns such as random patterns, a constant dc erase, etc. can be generated and written by the write element 312 as discussed above.

As desired, radial offsets can be applied to the transducer 308 to ensure that the edges of the tracks, as well as the medial portions thereof, are sufficiently overwritten a desired number of passes. A separate erasure operation can be applied but is not necessarily required, and can be carried out by performing a dc erase in which the same magnetic domain orientation is applied to the entire track by the write element between successive write cycles. Various levels of write current can be selected for passage through the write element 312 to vary the field strength of the written domains during different passes to further mask previously written data signatures.

Figure 21:
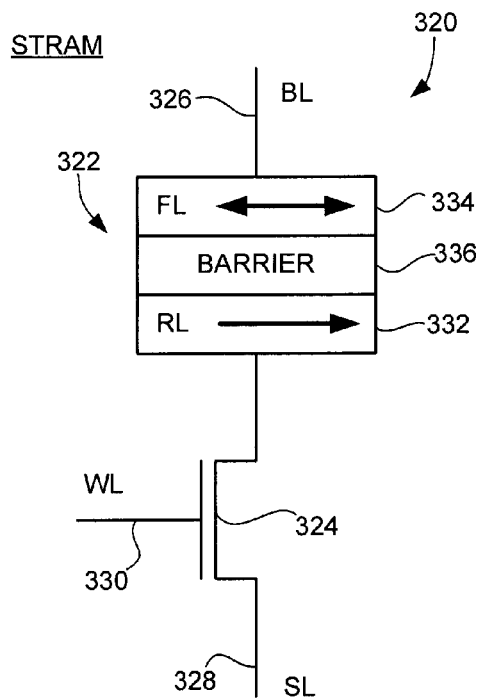
FIG. 21 illustrates a spin-torque transfer random access memory (STRAM) cell with which various embodiments of the present invention can be utilized.

FIG. 21 depicts a memory cell 320 arranged as a 1T1R STRAM memory cell. The STRAM memory cell includes a resistive memory element 322 characterized as a magnetic tunneling junction (MTJ), and a switching device 324 characterized as an nMOS transistor. The memory cell 320 is accessed by a number of control lines such as bit line (BL) 326, source line (SL) 328 and word line (WL) 330. Other connection configurations are contemplated such as a crosspoint array.

The MTJ 322 includes a pinned reference layer (RL) 332 having a fixed magnetic orientation and a free layer (FL) 334 having a variable magnetic orientation. The free layer 334 is separated from the reference layer 332 by an intervening tunnel barrier layer 336. Spin-torque write currents can be passed through the memory cell to set the magnetic orientation of the free layer 334 relative to the reference layer 332 to store data. A parallel orientation in which the free layer 334 is in the same magnetic orientation as the reference layer 332 provides a relatively lower electrical resistance RL, and an anti-parallel orientation in which the free layer 334 is opposite that of the reference layer 332 provides a relatively higher electrical resistance RH. The different resistances, and hence, the programmed state of the cell 320, can be determined by passing a relatively low magnitude read current through the cell and sensing the voltage drop thereacross.

It is contemplated that the previously stored magnetic domains of the free layer 334 may be discoverable using laboratory techniques, and so the various data sanitation approaches discussed herein can be readily applied to STRAM memory cells such as 320. For example, all of the cells may be overwritten to a selected state, such as all logical 0's or all logical 1's. The existing magnetic orientation of the free layer 334 may be read, the readback data bit may be inverted, and this new inverted bit may be written to change the orientation of the free layer. Random data may be successively written and forced bit inversions may occur to obtain the statistically desired distributions of different states. Different varying amount of write current or other parameters may be adjusted to further alter the magnetic domain signature of the free layer (and potentially other aspects of the memory cell).

Figure 22:
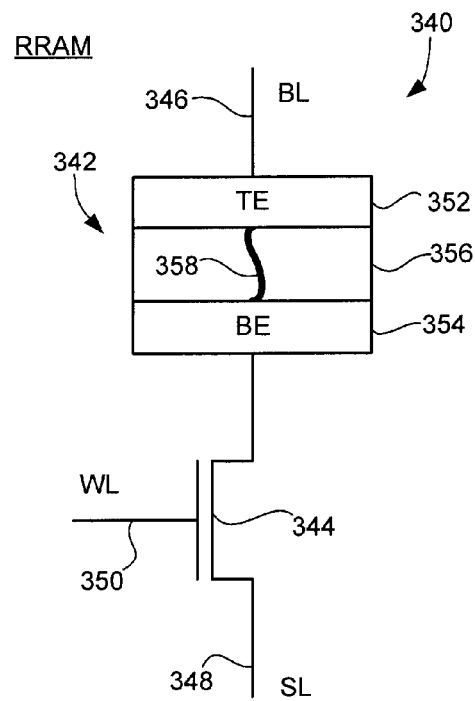
FIG. 22 illustrates a resistive random access memory (RRAM) cell with which various embodiments of the present invention can be utilized.

FIG. 22 illustrates another memory cell 340 characterized as a 1T1R RRAM cell. As with the STRAM cell in FIG. 21, the RRAM cell includes a resistive memory element 342 and a switching device 344, characterized as an nMOS transistor. The RRAM cell 340 is accessed by respective bit, word and source lines (BL, WL and SL) 346, 348 and 350.

The resistive memory element 342 includes top and bottom conductive electrodes (TE and BE) 352 and 354. These electrode layers are separated by an intervening oxide layer 356. Application of appropriate programming currents induces migration of conductive ions into the oxide layer 356 to form a conductive filament 358 that partially or completely spans the oxide layer and reduces the overall resistance of the cell. The filaments 358 can be subsequently removed by appropriate programming currents that urge migration of the ions back to the respective electrode layers.

As before, the remnants of ion migration and residual filament formation may be discoverable through laboratory analysis, enabling prior stored states to be discovered. It is contemplated that the various techniques discussed above can be readily adapted for use in RRAM cells such as FIG. 22 to mask such prior states.

While the secure erasure operations of the present disclosure have been discussed in terms of particular locations of memory that may store sensitive user data, it will be appreciated that the same sanitizing techniques can also be applied to other regions of the memory that store metadata or other control data that may be related to the user data files for which nondestructive purging has been requested.

The various techniques disclosed herein may provide a number of benefits, including reduced power consumption, reduced wear, shorter time implementation and greater levels of signature wiping over conventional approaches. The secure erasure operations disclosed herein can be adapted to a wide variety of memories and applications, and are not limited to any particular style or type of memory. For purposes of the appended claims, the term "logical address" and the like will include a range of logical addresses and may include, but is not limited to, a logical block address (LBA).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
    identifying an extended data set comprising multiple copies of data having a common logical address stored in different physical addresses within the memory, the multiple copies comprising a most current copy of the data and at least one stale copy of the data;
    determining a total accumulated size of the extended data set indicative of an accumulated total number of data bits in the multiple copies of the data stored in each of the different physical addresses within the memory;
    comparing the overall size of the extended data set to a predetermined threshold; and
    sanitizing at least a portion of the extended data set from the memory in relation to the overall size of the data set so that other previously stored data in the memory are retained in the memory, wherein a first type of sanitizing operation is performed responsive to the overall size of the extended data set exceeding the predetermined threshold and a different, second type of sanitizing operation is performed responsive to the overall size not exceeding the predetermined threshold.

2. The method of claim 1, wherein the memory is arranged as a plurality of erasure blocks, the first type of sanitizing operation comprises performing a garbage collection operation upon all of the erasure blocks in the memory, and the second type of sanitizing operation comprises a selected one of overwriting data onto the at least a portion of the extended data set or destroying at least one encryption key associated with the at least a portion of the extended data set.

3. The method of claim 1, wherein the entire extended data set, including the most current copy of the data, is permanently removed from the memory and not returned thereto as a result of the sanitizing step.

4. The method of claim 1, further comprising comparing the total accumulated size of the extended data set to a second selected threshold lower than the selected threshold, and performing a different, third type of sanitizing operation upon the data set responsive to the total accumulated size being below the second selected threshold.

5. The method of claim 1, in which the second type of sanitizing operation comprises destroying an encryption key used to encrypt at least a portion of the extended data set prior to storage thereof in the memory.

6. The method of claim 1, in which the second type of sanitizing operation comprises performing a garbage collection operation upon at least one erasure block of the memory, the garbage collection operation comprising an erasure of the at least one erasure block.

7. The method of claim 1, in which the second type of sanitizing operation comprises overwriting memory cells in the memory which store data bits of the extended data set.

8. The method of claim 1, in which the sanitizing operation removes at least one older copy of data in the extended data set from the memory and retains, in the memory, the most current copy of data in the extended data set and a predetermined plural number of older copies of data in the extended data set.

9. The method of claim 1, in which the extended data set includes a first copy of data in a first garbage collection unit (GCU) of the memory and a second copy of the data in a different, second GCU of the memory, and the identifying step comprises referencing respective GCU sequence values stored in the first and second GCUs to identify the extended data set.

10. The method of claim 1, in which the first and second types of sanitizing are each characterized as a non-destructive purge of the extended data set so that the physical memory locations in which the extended data set were stored can be subsequently used to store new data.

11. The method of claim 1, in which at least a selected one of the first or second types of sanitizing operations is characterized as a destructive purge of the extended data set so that at least some of the physical memory locations in which the extended data set were stored are damaged so as to be incapable of subsequently storing new data.

12. An apparatus comprising:
a non-volatile memory which stores an extended data set comprising multiple copies of data having a common logical address and different physical addresses within the memory, the multiple copies comprising a most current version of the data and at least one stale version of the data; and
a controller adapted to determine an overall size of the extended data set, to compare the overall size to a predetermined threshold, and to sanitize the extended data set from the memory responsive to said determined overall size exceeding the predetermined threshold so that the entire extended data set is non-destructively and permanently purged from the memory and other data in the memory are retained, wherein the overall size of the extended data set is indicative of an accumulated total number of data bits in the multiple copies of the data stored in each of the different physical addresses within the memory;
in which the controller performs a first type of sanitizing operation upon the extended data set responsive to a first overall size of the extended data set exceeding the predetermined threshold and performs a different, second type of sanitizing operation responsive to a different, second overall size of the extended data set less than the predetermined threshold.

13. The apparatus of claim 12, in which the most current version of the data is stored in a first physical location of the memory and the at least one stale version of the data is stored in a different, second physical location of the memory.

14. The apparatus of claim 12, further comprising a monitor circuit coupled to the controller which generates an internal trigger to commence the sanitizing operation upon the extended data set.

15. The apparatus of claim 14, in which the monitor circuit generates the internal trigger responsive to the number of said multiple copies of the data reaching a predetermined threshold.

16. The apparatus of claim 12, in which the memory is arranged as a plurality of garbage collection units (GCU) each allocated and erased as a unit, each GCU storing a GCU sequence value indicative of an allocation order of the GCUs, the controller referencing the GCU sequence values to identify the physical locations of the multiple copies of the data forming the extended data set.

17. The apparatus of claim 12, in which the different first and second sanitizing operations are each selected from a group comprising a garbage collection operation upon the entire memory, a garbage collection operation limited to a portion of the memory, a destruction of an encryption key used to encrypt at least a portion of the extended data set, a data overwrite operation so that at least one data bit of the extended data set is overwritten, or a data overwrite/erasure cycle.

18. A storage device comprising a non-volatile memory, a monitor circuit, and a controller adapted to, responsive to a trigger signal generated by the monitor circuit, sanitize an extended data set from the non-volatile memory responsive to an overall size of the data set, the data set comprising multiple copies of host data sharing a common logical address and having different physical addresses within the memory, said multiple copies comprising a most current version of the data and a plurality of older, stale versions of the data, said sanitizing operable to purge the extended data set from the memory so that the most current version of the data and the plurality of older, stale versions of the data are permanently removed from the memory while retaining other host data in the memory, wherein the overall size of the extended data set is indicative of an accumulated total number of data bits in the multiple copies of the data stored in each of the different physical addresses within the memory;
in which the controller applies a first data sanitizing operation to the memory responsive to the overall size exceeding a predetermined threshold, the controller applying a different, second data sanitizing operation to the memory responsive to the overall size not exceeding the predetermined threshold.

19. The storage device of claim 18, in which the monitor circuit generates the trigger signal responsive to said multiple copies of the data reaching a predetermined threshold.

20. The storage device of claim 18, in which the sanitizing operation carried out by the controller is characterized as a non-destructive purge of the extended data set so that the physical memory locations in which the extended data set were stored can be subsequently used to store new data.

21. The storage device of claim 18, in which the sanitizing operation is characterized as a destructive purge of the extended data set so that at least some of the physical memory locations in which the extended data set were stored are damaged so as to be incapable of subsequently storing new data.

22. The storage device of claim 18, in which the controller is further adapted to perform a search operation upon the memory to identify physical locations of said multiple copies.

23. The storage device of claim 18, characterized as a flash memory array having a total number of erasure blocks, and wherein the controller sanitizes the memory by performing a garbage collection operation upon each of the total number of erasure blocks.

* * * * *